US012715444B2

(12) United States Patent
Salif et al.

(10) Patent No.: US 12,715,444 B2
(45) Date of Patent: Aug. 25, 2026

(54) DETERMINATION OF SLIP TARGET FOR A VEHICLE ENGINE SPEED CONTROLLER

(71) Applicant: Volvo Truck Corporation, Gothenburg (SE)

(72) Inventors: Ramadan Salif, Gothenburg (SE); Teodoro Bora, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/850,313

(22) PCT Filed: Apr. 6, 2022

(86) PCT No.: PCT/EP2022/059111
§ 371 (c)(1),
(2) Date: Sep. 24, 2024

(87) PCT Pub. No.: WO2023/193898
PCT Pub. Date: Oct. 12, 2023

(65) Prior Publication Data
US 2025/0214589 A1 Jul. 3, 2025

(51) Int. Cl.
*B60W 30/18* (2012.01)
*B60W 10/06* (2006.01)

(52) U.S. Cl.
CPC ....... *B60W 30/18172* (2013.01); *B60W 10/06* (2013.01); *B60W 2520/26* (2013.01);
(Continued)

(58) Field of Classification Search
CPC .......... B60W 30/18172; B60W 10/06; B60W 2520/26; B60W 2520/28;
(Continued)

(56) References Cited

U.S. PATENT DOCUMENTS 4,896,090 A 1/1990 Balch et al.
5,292,188 A 3/1994 Okazaki
(Continued)

FOREIGN PATENT DOCUMENTS

CN 102171085 A 8/2011
CN 102556024 A 7/2012
(Continued)

OTHER PUBLICATIONS

Machine Translation of EP3299237A1 PDF File Name: "EP3299237A1_Machine_Translation.pdf" (Year: 2018).*
(Continued)

*Primary Examiner* — Grant Moubry
*Assistant Examiner* — Ruben Picon-Feliciano
(74) *Attorney, Agent, or Firm* — Withrow & Terranova, PLLC

(57) ABSTRACT

Techniques for determining a modified slip target for a vehicle engine speed controller are disclosed. A method comprises comparing a difference between a maximum wheel speed and a minimum wheel speed for wheels of open differential and driven axles controlled by the vehicle engine speed controller to a preconfigured wheel speed offset. The method comprises setting, at least when the difference exceeds the preconfigured wheel speed offset, the modified slip target to be lower than a requested slip target for the vehicle engine speed controller.

17 Claims, 7 Drawing Sheets

(52) U.S. Cl.
CPC . *B60W 2520/28* (2013.01); *B60W 2710/0644* (2013.01); *B60W 2720/26* (2013.01)

(58) Field of Classification Search
CPC ..... B60W 2710/0644; B60W 2720/26; B60W 2050/0027; B60W 2300/125
See application file for complete search history.

(56) References Cited

U.S. PATENT DOCUMENTS

| | | | | |
|---|---|---|---|---|
| 9,145,127 | B2 * | 9/2015 | Uematsu | B60W 10/184 |
| 9,213,522 | B2 * | 12/2015 | Prakah-Asante | B60W 40/09 |
| 2004/0041469 | A1 | 3/2004 | Ishikawa et al. | |
| 2009/0107748 | A1 * | 4/2009 | Luehrsen | B60K 28/16 701/84 |
| 2010/0114447 | A1 * | 5/2010 | Moriki | B60L 3/106 701/74 |
| 2016/0356370 | A1 | 12/2016 | Richards et al. | |
| 2019/0160966 | A1 | 5/2019 | Jung et al. | |
| 2021/0078581 | A1 * | 3/2021 | Velazquez Alcantar | B60L 3/10 |

FOREIGN PATENT DOCUMENTS

| | | | | |
|---|---|---|---|---|
| CN | 107531237 | A | 1/2018 | |
| CN | 108248449 | A | 7/2018 | |
| CN | 111094044 | A | 5/2020 | |
| DE | 10248079 | A1 | 4/2003 | |
| EP | 1396402 | A1 | 3/2004 | |
| EP | 2374680 | A1 | 10/2011 | |
| EP | 3299237 | A1 * | 3/2018 | B60K 28/16 |

OTHER PUBLICATIONS

First Office Action for Chinese Patent Application No. 202280093922.4, mailed Dec. 17, 2024, 15 pages.

International Search Report and Written Opinion for International Patent Application No. PCT/EP2022/059111, mailed Dec. 9, 2022, 14 pages.

Second Written Opinion for International Patent Application No. PCT/EP2022/059111, mailed Mar. 1, 2024, 7 pages.

International Preliminary Report on Patentability for International Patent Application No. PCT/EP2022/059111, mailed Jun. 19, 2024, 15 pages.

* cited by examiner (i): Wheel speed of wheels of first rear axle
(ii): Wheel speed of wheels of second rear axle
(iii): Output shaft speed
(iv): Target shaft speed
(v): Vehicle speed

DETERMINATION OF SLIP TARGET FOR A VEHICLE ENGINE SPEED CONTROLLER

This application is a 35 USC 371 national phase filing of International Application No. PCT/EP2022/059111, filed Apr. 6, 2022, the disclosure of which is incorporated herein by reference in its entirety.

TECHNICAL FIELD

Embodiments presented herein relate to a method, a system, and a computer program for determining a modified slip target for a vehicle engine speed controller. Embodiments presented herein further relate to a vehicle comprising such a system.

BACKGROUND

In general terms, split friction (or μ (mu)-split) is a road condition that occurs when the friction significantly differs between the left and the right wheel path of a vehicle. The road may then not be perceived as hazardous when accelerating, cruising or even braking softly. But in a case of hard (emergency-)braking, the vehicle will start to rotate over the wheel path offering highest grip. Split friction may cause jack-knifing of articulated trucks, while trucks with towed trailers may experience trailer swing phenomena. Split friction may be caused by an improper road spot repair that results in high variance of texture and colour (for example due to that thin ice on newly paved black spots thaws faster than ice on old greyish asphalt) across the road section.

In more detail, due to the mechanical function of an open differential, the wheel speeds between right and left might spin in different speeds as well over the first or second driven axle, even at straight driving in case of traction loss due to different normal loads, friction, conditions, tyre wear etc.

Once one of the wheels spins above the peak of the tyre curve, most of the propulsive torque is likely be transmitted to the most spinning wheel and become "one-wheel drive per driven axle" system. The wheel will also have higher speed than the differential ingoing cardan axle as the outgoing speeds are mechanically ensured to be a mean of the input speed. For a wheel slip controller that uses the output shaft speed to control the slip due to its benefits of fast signal response and resolution this becomes problematic once the wheel speeds start to differ from left to right or between the first or second driven axle, due to the mechanical characteristics as per stated previously.

SUMMARY

An object of the embodiments disclosed herein is to address the issues noted above.

A particular object of the embodiments disclosed herein is to provide techniques for adapting a requested slip target for a vehicle engine speed controller.

According to a first aspect, the object is achieved by a method for determining a modified slip target for a vehicle engine speed controller. The method comprises comparing a difference between a maximum wheel speed and a minimum wheel speed for wheels of open differential and driven axles controlled by the vehicle engine speed controller to a preconfigured wheel speed offset. The method comprises setting, at least when the difference exceeds the preconfigured wheel speed offset, the modified slip target to be lower than a requested slip target for the vehicle engine speed controller.

According to a second aspect, the object is achieved by a system for determining a modified slip target for a vehicle engine speed controller. The system comprises processing circuitry. The processing circuitry is configured to cause the system to compare a difference between a maximum wheel speed and a minimum wheel speed for wheels of open differential and driven axles controlled by the vehicle engine speed controller to a preconfigured wheel speed offset. The processing circuitry is configured to cause the system to set, at least when the difference exceeds the preconfigured wheel speed offset, the modified slip target to be lower than a requested slip target for the vehicle engine speed controller.

According to a third aspect, the object is achieved by a vehicle comprising a system according the second aspect.

According to a fourth aspect, the object is achieved by a computer program for determining a modified slip target for a vehicle engine speed controller, the computer program comprising computer program code which, when run on a system, causes the system to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these techniques enable all driven wheels to have the wheel slip below the peak.

Further advantageously, by ensuring that the wheel slip of all driven wheels is below the peak, not only the tractive force of the most spinning wheel is increased, but also the slip of the slower wheels can potentially be increased. In turn, this can increase the tractive force on the slower wheels as well.

Advantageously, these techniques therefore increase vehicle safety in situations of traction loss due to road conditions but also different normal loads, friction, tyre wear, etc.

Further advantageously, by monitoring wheel slips, the herein disclosed techniques are robust against differential lock engagement.

According to an embodiment, the modified slip target is set be lower than a requested slip target for the vehicle engine speed controller when the difference is larger than 0.

According to an embodiment, the modified slip target is set to at most be equal to the requested slip target when the difference fails to exceed the preconfigured wheel speed offset.

Further advantages and advantageous features of the inventive concept are disclosed in the following description and in the dependent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF EXAMPLE EMBODIMENTS OF THE INVENTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The issues addressed by the present disclosure concern situations where the wheel speed differs, such as in the above split friction (or μ (mu)-split) road conditions, but also other road conditions, loads, tyre wear, etc. Due to the mechanical function of an open differential, the wheel speeds between the right wheel and the left wheel of the same axle might spin in different speeds. For the same reasons, the wheel speeds of the wheels of a first driven axle might be different from the wheel speeds of a second driven axle, even at straight driving in case of traction loss due to road conditions but also different normal loads, friction, tyre wear, etc.

As an illustrative example, for the same given output shaft speed (for example given by the mean of all the driven wheels), the wheel slips of one axle might become zero whereas all torque transfers to the other axle hence ending up with substantial higher slip value. This will not only reduce the tractive force, but also be a safety concern, especially at higher speeds as excessive longitudinal slip will reduce lateral force capability considerably.

Figure 1:
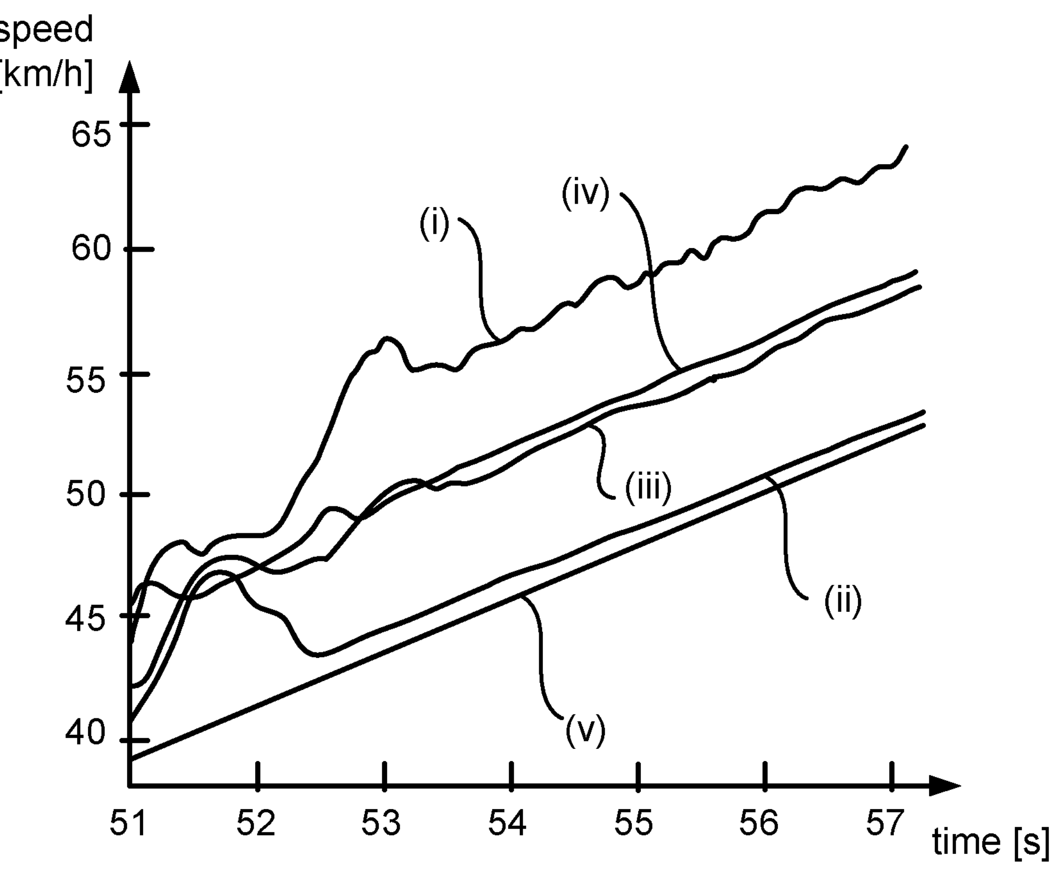
FIG. 1 shows results of a test according to an example.

Reference is here made to FIG. 1 which shows results of a test made on basalt area. The results are shown for a vehicle with two driven rear axles. The second rear axle (rear axle 2) has zero slip whereas the first rear axle (rear axle 1) has 25-30% slip. The target on the output shaft is 15% and perfectly control. The phenomenon shown after approximately 57.5 seconds is caused by an upwards gear shift.

According to the present disclosure, to ensure optimal startability and tractive force for vehicles with open differential and multiple driven axles in situations of traction loss due to road conditions but also different normal loads, friction, tyre wear, etc., a requested slip target $\mu_{req}$ for the vehicle engine speed controller is replaced by a modified slip target $\mu_{trgt}$.

Figure 2:
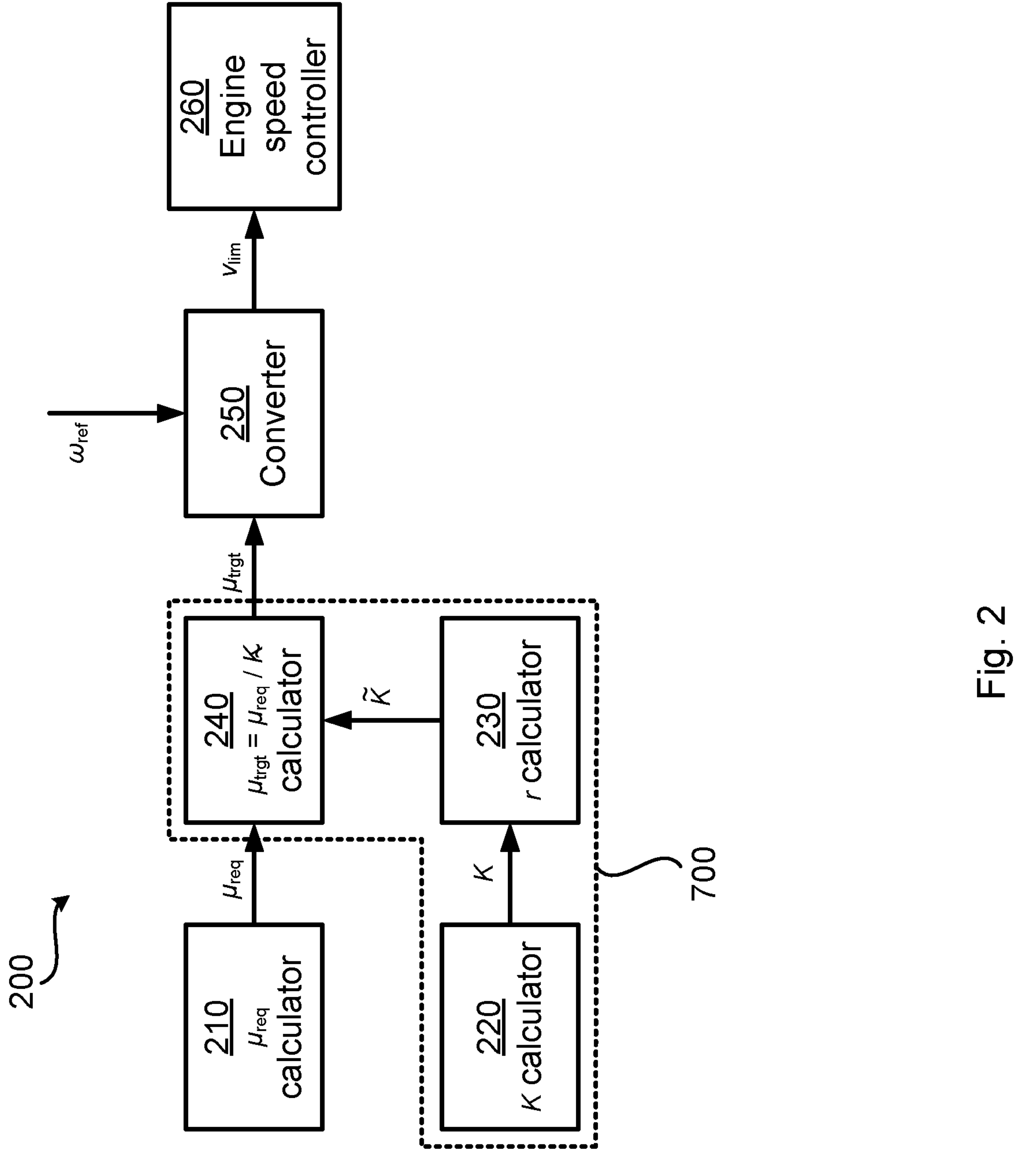
FIG. 2 is a high-level block diagram of the complete control loop for a vehicle engine speed controller according to an embodiment.

In FIG. 2 is illustrated a high-level block diagram 200 of the complete control loop for the average wheel slip and a vehicle engine speed controller, where the vehicle engine speed controller is represented by the engine speed controller block 260. The slip on the wheels is controlled by controlling the engine/electric machine speed by means of providing an engine speed limit vim to the engine speed controller block 260. Conventionally, the engine speed limit $v_{lim}$ is calculated in a converter block 250 from a requested slip target $\mu_{req}$, as provided by a $\mu_{req}$ calculator block 210, and a reference wheel speed $\mu_{ref}$. However, according to the herein disclosed embodiments, the requested slip target $\mu_{req}$ is replaced by a modified slip target $\mu_{trgt}$. In turn, the modified slip target $\mu_{trgt}$ is based on a reduction factor K. This reduction factor K is used to, at least temporarily, lower the actual average slip (lowering the wheel slip) by lowering the target speed $v_{lim}$ used by the closed loop controller. The functionality of each block 220-250 will be disclosed in conjunction with reference to FIG. 3. The engine/electric machine as controlled by the vehicle engine speed controller is not shown in FIG. 2 and can be located at different positions along the driveline, depending on the implementation.

Figure 3:
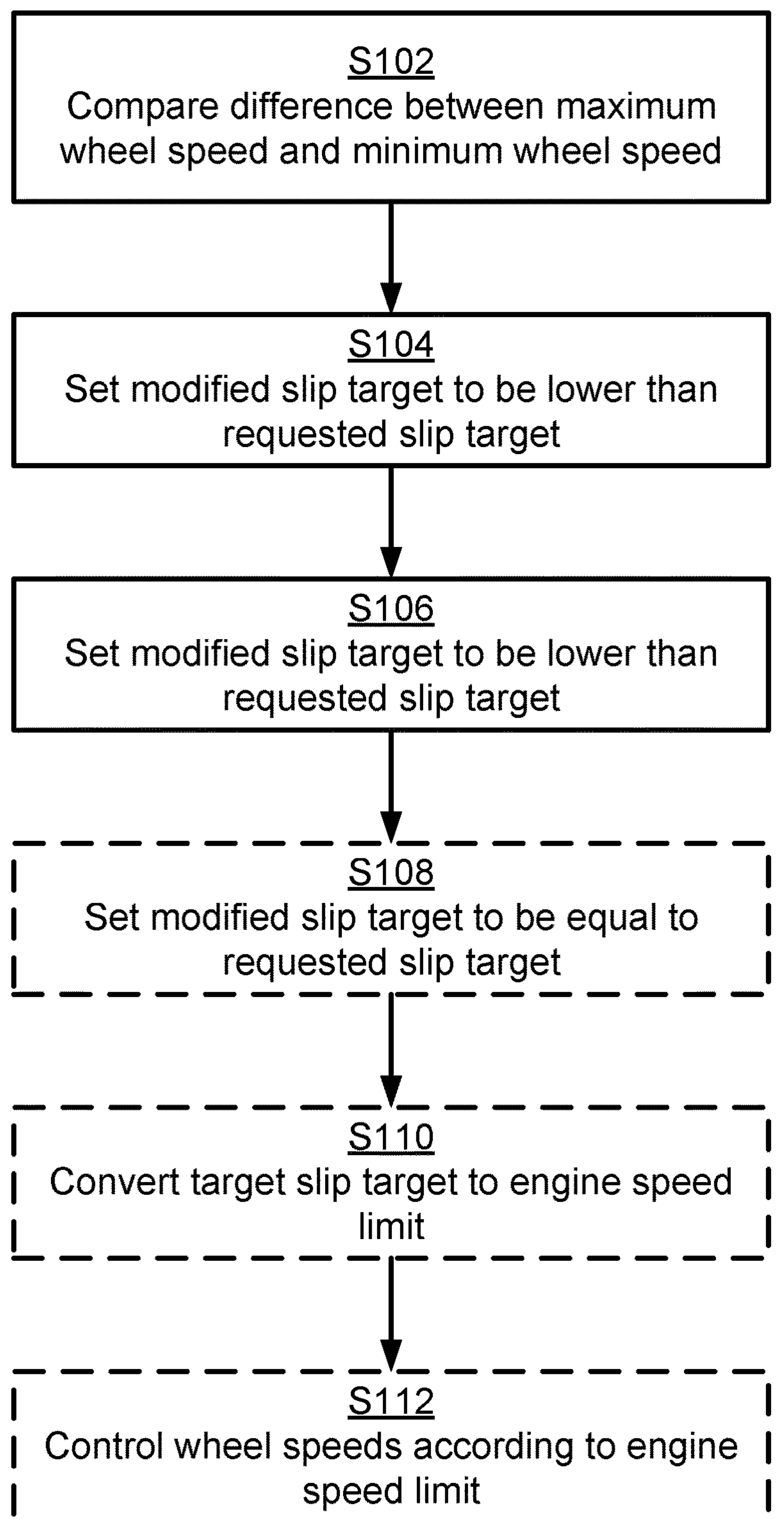
FIG. 3 is a flowchart of methods according to embodiments.

FIG. 3 is a flowchart illustrating embodiments of methods for determining a modified slip target $\mu_{trgt}$ for a vehicle engine speed controller. The methods are performed in a system 700. The system 700 at least implements blocks 220, 230, 240 in FIG. 2 but might further implement also any or all of the remaining blocks 210, 250, 260. The methods are advantageously provided as computer programs.

The method is based on using a difference between the maximum and minimum wheel speeds $\omega_{max}$, $\omega_{min}$ for wheels of an open differential and driven axles as controlled by the vehicle engine speed controller. In general terms, the maximum wheel speed $\omega_{max}$ is determined as:

$$\omega_{max} = \max(\omega_1, \omega_2, \omega_3, \ldots)$$

and the minimum wheel speed $\omega_{min}$ is determined as:

$$\omega_{min} = \min(\omega_1, \omega_2, \omega_3, \ldots)$$

where $\omega_i$ is the wheel speed for wheel i of the open differential and driven axles of the vehicle.

A difference between the maximum wheel speed $\omega_{max}$ and the minimum wheel speed $\omega_{min}$ for the wheels of open differential and driven axles controlled by the vehicle engine speed controller is compared (step S102) to a preconfigured wheel speed offset ΔS.

Different actions are taken depending on whether the difference $\omega_{max}-\omega_{min}$ exceeds the preconfigured wheel speed offset ΔS.

At least when the difference $\omega_{max}-\omega_{min}$ exceeds the preconfigured wheel speed offset ΔS, the modified slip target $\mu_{trgt}$ is set (step S104) to be lower than a requested slip target $\mu_{req}$ for the vehicle engine speed controller.

Embodiments relating to further details of determining the modified slip target $\mu_{trgt}$ for a vehicle engine speed controller will now be disclosed.

In some embodiments, when the difference $\omega_{max}-\omega_{min}$ is larger than 0, the modified slip target $\mu_{trgt}$ is set (step S106) to be lower than a requested slip target $\mu_{req}$ for the vehicle engine speed controller.

In some embodiments, when the difference $\omega_{max}-\omega_{min}$ fails to exceed the preconfigured wheel speed offset ΔS, the modified slip target $\mu_{trgt}$ is set (step S108) to at most be equal to the requested slip target $\mu_{req}$.

In some embodiments, the modified slip target $\mu_{trgt}$ is, with respect to a reference wheel speed $\omega_{ref}$, converted (step S110) to an engine speed limit $v_{lim}$. In FIG. 2 this operation is represented by the converter block 250.

In some embodiments, the wheel speeds of the wheels of the open differential and driven axles are controlled (step S112) according to the engine speed limit $v_{lim}$. In FIG. 2 this operation is represented by the engine speed controller block 260.

Further aspects of the modified slip target $\mu_{trgt}$ will be disclosed next.

The modified slip target $\mu_{trgt}$ can be mathematically related to the requested slip target $\mu_{req}$. Since $\mu_{trgt} \leq \mu_{req}$ it follows that the modified slip target $\mu_{trgt}$ can be related to the requested slip target $\mu_{req}$ using a reduction factor K. In particular, in some embodiments, the modified slip target is determined as:

$$\mu_{trgt} = \mu_{req} / K$$

where K≥1 is a reduction factor. In FIG. 2 this operation is represented by the $\mu_{trgt}=\mu_{reg}/\tilde{K}$ calculator block 240, where $\tilde{K}$ is a modified reduction factor, as will be disclosed below, has replaced $\tilde{K}$.

The reduction factor K is a function of the difference $\omega_{max}-\omega_{min}$ and the preconfigured wheel speed offset ΔS. In some examples, the reduction factor K is determined according $$K = \min\left(\max\left(\frac{\omega_{max}-\omega_{min}}{\Delta S} + \theta, c_1\right), c_2\right)$$

where θ is an offset value, where $c_1$ and $c_2$ are constants, and where $1 \leq c_1 < c_2$. In FIG. 2 this operation is represented by the K calculator block 220.

In some examples, $c_2 \leq 2$. In some examples, $c_1=1$, and $c_2=2$.

The offset value θ can be used to offset the compensation avoiding the reduction factor K to change on a very small speed difference $\omega_{max}-\omega_{min}$.

Figure 4:
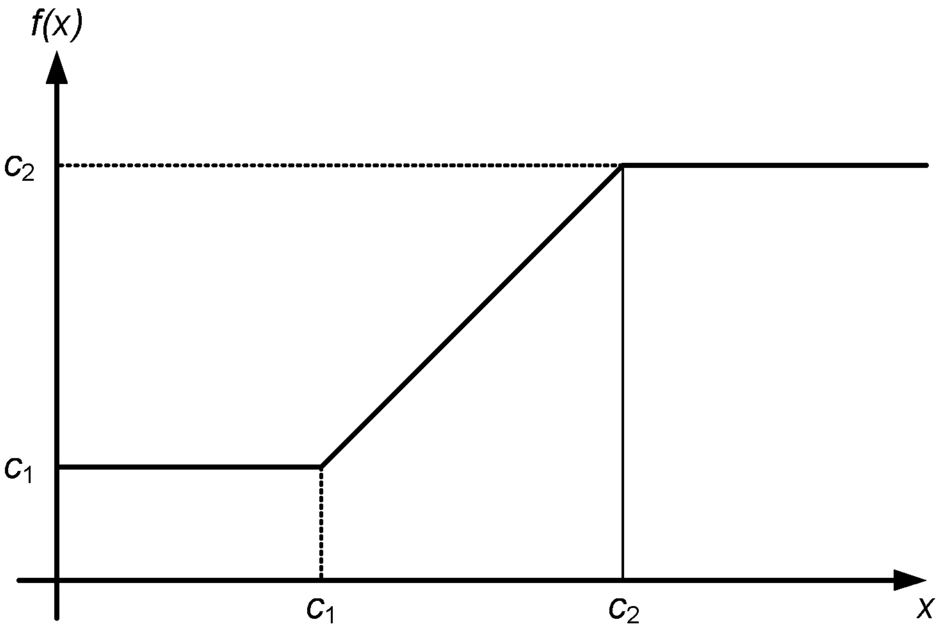
FIG. 4 schematically illustrates K=f(x) according to an embodiment.

FIG. 4 schematically illustrates K=f(min (max (x, $c_1$), $c_2$)), where:

$$x = \frac{\omega_{max}-\omega_{min}}{\Delta S} + \theta$$

Further aspects of the offset value θ will be disclosed next.

In case θ=0, then the condition $(\omega_{max}-\omega_{min})>\Delta S$ (as in S104) needs to be fulfilled for any compensation to be made to the requested slip target $\mu_{reg}$. That is, for the example where θ=0, where $c_1=1$, and where $c_2=2$ it follows that:

$$K = \min\left(\max\left(\frac{\omega_{max}-\omega_{min}}{\Delta S}, 1.0\right), 2.0\right) > 1 \text{ when } (\omega_{max}-\omega_{min}) > \Delta S$$

In case θ=−1, then the condition $(\omega_{max}-\omega_{min})>2\Delta S$ needs to be fulfilled for any compensation to be made to the requested slip target $\mu_{req}$. That is, for the example where θ=−1, where $c_1=1$, and where $c_2=2$ it follows that:

$$K = \min\left(\max\left(\frac{\omega_{max}-\omega_{min}}{\Delta S} - 1, 1.0\right), 2.0\right) > 1 \text{ when } (\omega_{max}-\omega_{min}) > 2\Delta S$$

On the other hand, in case θ=+1, then the condition $(\omega_{max}-\omega_{min})>0$ (as in step S106) needs to be fulfilled for any compensation to be made to the requested slip target $\mu_{req}$. That is, for the example where θ=+1, where $c_1=1$, and where $c_2=2$ it follows that:

$$K = \min\left(\max\left(\frac{\omega_{max}-\omega_{min}}{\Delta S} + 1, 1.0\right), 2.0\right) > 1 \text{ when } (\omega_{max}-\omega_{min}) > 0$$

Therefore, the offset value θ acts as a hysteresis component, or filter. It is here noted that the offset value θ can take other values than −1, 0, +1.

In case θ=−1, then there will not be any compensation made to the requested slip target $\mu_{req}$ for speed variations up to $(c_1-\theta)$ ΔS (i.e., not until $(\omega_{max}-\omega_{min})>(c_1-\theta)$ ΔS). On the other hand, in case θ=+1, then any very small variation in the wheel speed (i.e., $(\omega_{max}-\omega_{min})>0$) will result in a compensation being made to the requested slip target $\mu_{req}$.

According to a first numerical example, assume that θ=−1, $c_1=1$, $c_2=2$, and ΔS=4 [km/h]. Then, the relation between $(\omega_{max}-\omega_{min})$ and the compensation factor K will be as disclosed in Table 1.

TABLE 1

| Numerical values for first numerical example | |
|---|---|
| $(\omega_{max}-\omega_{min}) \leq 8$ [km/h] | K = 1 |
| $8 < (\omega_{max}-\omega_{min}) < 12$ [km/h] | 1 < K < 2 |
| $12 \leq (\omega_{max}-\omega_{min})$ [km/h] | K = 2 |

According to a second numerical example, assume that θ=+1, $c_1=1$, $c_2=2$, and ΔS=4 [km/h]. Then, the relation between $(\omega_{max}-\omega_{min})$ and the compensation factor K will be as disclosed in Table 2.

TABLE 2

| Numerical values for second numerical example | |
|---|---|
| $(\omega_{max}-\omega_{min}) = 0$ [km/h] | K = 1 |
| $0 < (\omega_{max}-\omega_{min}) < 4$ [km/h] | 1 < K < 2 |
| $4 \leq (\omega_{max}-\omega_{min})$ [km/h] | K = 2 |

By monitoring the wheel speeds $\omega_i$ over the open differential and driven axles, a reduction factor K can be calculated as a function of the wheel speed offset ΔS. When the highest speed difference, as given by $\omega_{max}-\omega_{min}$, between the wheels reaches the value ΔS, the maximum reduction factor becomes K=2 (assuming θ=1 and $c_2$=2) in the above equation. This results in that the modified slip target $\mu_{trgt}$ is equal to half of the requested slip target $\mu_{req}$. That is:

$$\mu_{trgt} = \mu_{req} / K = 0.5 \cdot \mu_{req}$$

The modified slip target $\mu_{trgt}$ is sent to the wheel slip controller.

In some examples, the slip target is allowed to instantly decrease but only to gradually increase. In particular, in some embodiments, the reduction factor K is limited to, over time, change differently depending on whether the difference $\omega_{max}-\omega_{min}$ is increasing or decreasing over time. In this respect, if the difference $\omega_{max}-\omega_{min}$ is increasing over time, then $$\frac{dK}{dt} > 0, \text{ where } \frac{dK}{dt}$$

is the time derivative of the reduction factor K. Likewise, if the difference $\omega_{max}-\omega_{min}$ is decreasing over time, then $$\frac{dK}{dt} < 0.$$

In particular, in some examples, the reduction factor K is limited to, over time, change at most according to a rate of change, r, that is limited to:

$$r = \begin{cases} \infty & \text{when } \frac{dK}{dt} > 0 \\ K_{RtLim} & \text{otherwise} \end{cases}$$

where $$\frac{dK}{dt}$$

thus describes how much the reduction factor K changes over time, and where $K_{RtLim}<0$ is a constant. Therefore, in some examples, the value of K used in the calculation of the modified slip target $\mu_{trgt}$ is replaced by $\tilde{K}$ where $\tilde{K}$ depends on K and r. In FIG. 2 this operation is represented by the r calculator block 230.

Therefore, the preconfigured wheel speed offset ΔS acts as a proportional control term whilst the rate limitation, as defined by the rate of change r, mimics a human driver behavior. For example, upon experiencing a sudden increase in slip, a driver is likely to release the accelerator pedal, and then press it carefully as the slip seems under control (given that the actual friction level is pretty unknown and proven to be not reliably high as the wheels were slipping moments ago).

Figure 5:
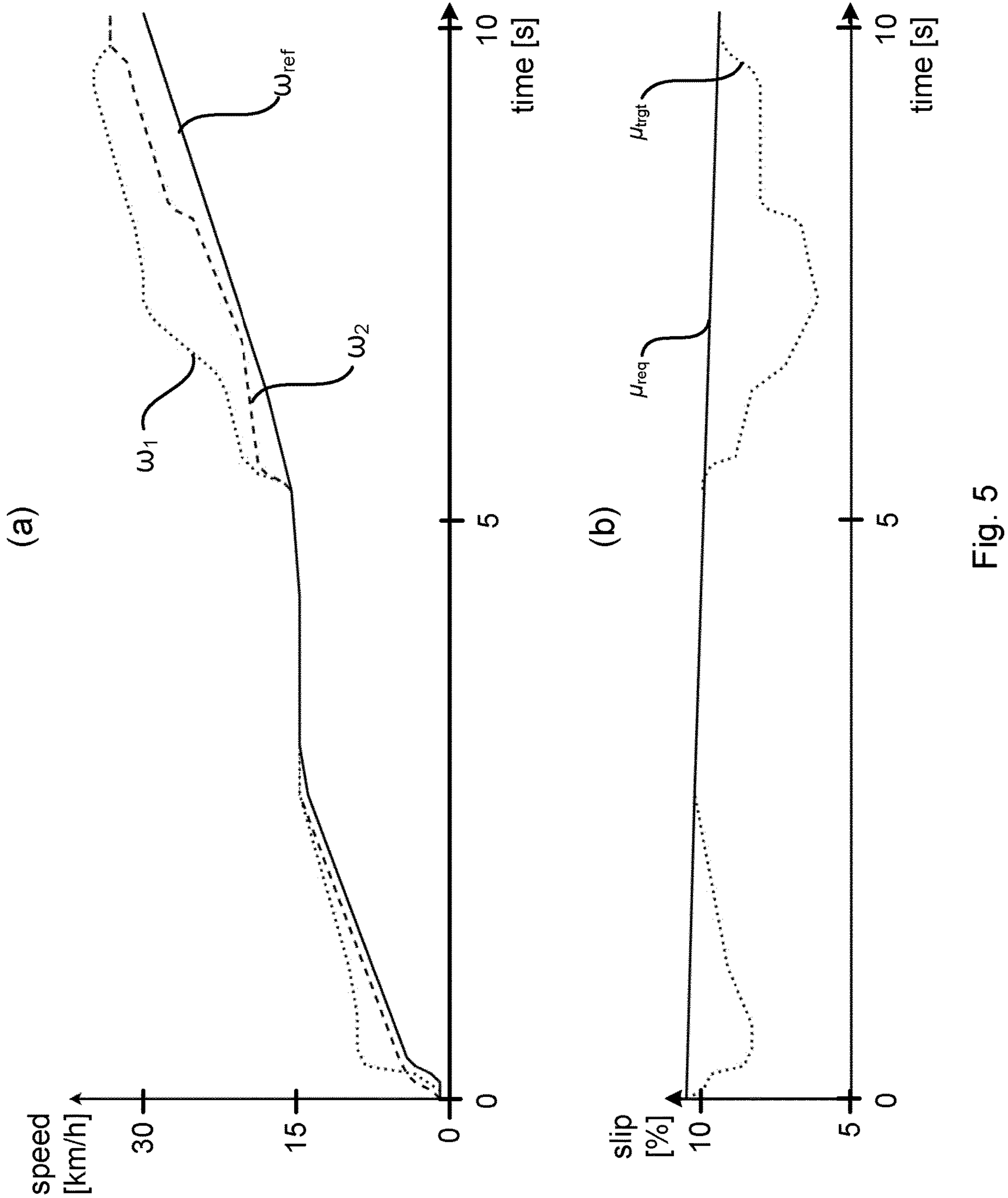
FIG. 5 shows results of application of the herein disclosed embodiments.

FIG. 5 shows results of application of the herein disclosed embodiments. In FIG. 5(*a*) is shown the wheel speed $\omega_1$ of the rear right wheel of one rear axle and the wheel speed $\omega_2$ of the left rear wheel of the same rear axle together with a reference wheel speed $\mu_{ref}$. In FIG. 5(*b*) is shown that a requested slip target $\mu_{req}$ is replaced by a modified slip target $\mu_{trgt}$ that instead of the requested slip target $\mu_{req}$ is sent to a closed-loop vehicle engine speed controller. The modified slip target $\mu_{trgt}$ is reduced compared to the requested slip target $\mu_{req}$, given that one or more of the wheels (specially the rear right wheel in this example) is spinning out.

Figure 6:
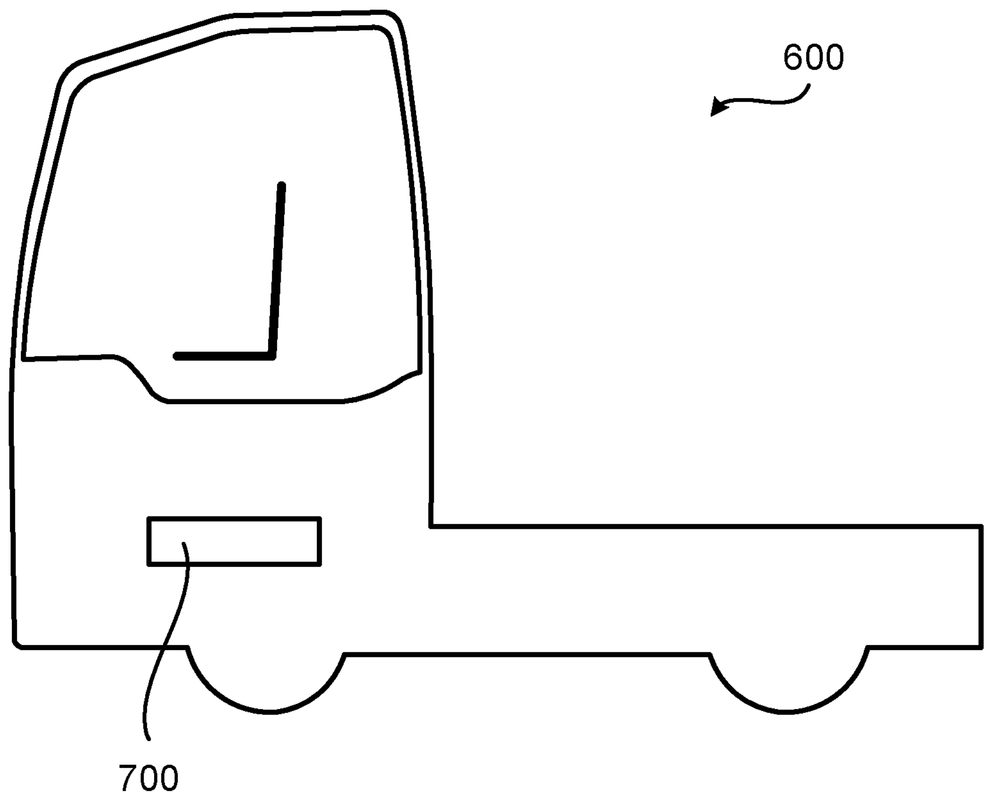
FIG. 6 is a schematic illustration of a vehicle according to an embodiment.

The herein disclosed systems 700 are suitable for use in a vehicle, such as a heavy-duty vehicle. FIG. 6 schematically illustrates a vehicle 600 comprising a system 700 as herein disclosed. In some embodiments, the vehicle 600 is a heavy-duty vehicle. In this respect, the present inventive concept is applicable to different types of heavy-duty vehicles, such as, but not limited to, trucks, buses and construction equipment. Further, the present disclosure presents a way to control wheel speeds trough the output shaft speed and applies for all kinds of powertrains, electrical drivelines, or conventional drivelines for multiple driven axles.

Figure 7:
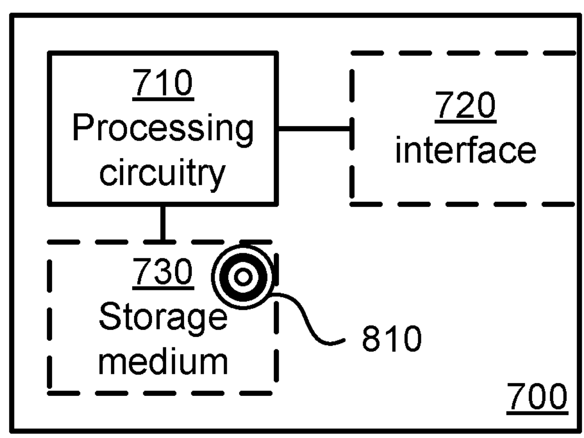
FIG. 7 is a schematic diagram showing functional units of a system according to an embodiment.

FIG. 7 schematically illustrates, in terms of a number of functional units, the components of a system 700 according to an embodiment. As disclosed above. The system 700 at least implements blocks 220, 230, 240 in FIG. 2 but might further implement also the remaining blocks 210, 250, 260. Processing circuitry 710 is provided using any combination of one or more of a suitable central processing unit (CPU), multiprocessor, microcontroller, digital signal processor (DSP), etc., capable of executing software instructions stored in a computer program product 810 (as in FIG. 8), e.g., in the form of a storage medium 730. The processing circuitry 710 may further be provided as at least one application specific integrated circuit (ΔSIC), or field programmable gate array (FPGA).

Particularly, the processing circuitry 710 is configured to cause the system 700 to perform a set of operations, or steps, as disclosed above. For example, the storage medium 730 may store the set of operations, and the processing circuitry 710 may be configured to retrieve the set of operations from the storage medium 730 to cause the system 700 to perform the set of operations. The set of operations may be provided as a set of executable instructions.

Thus, the processing circuitry 710 is thereby arranged to execute methods as herein disclosed. The storage medium 730 may also comprise persistent storage, which, for example, can be any single one or combination of magnetic memory, optical memory, solid state memory or even remotely mounted memory. The system 700 may further comprise an interface 720 at least configured for communications with other functions, nodes, and devices. The processing circuitry 710 controls the general operation of the system 700 e.g., by sending data and control signals to the interface 720 and the storage medium 730, by receiving data and reports from the interface 720, and by retrieving data and instructions from the storage medium 730. Other components, as well as the related functionality, of the system 700 are omitted in order not to obscure the concepts presented herein.

Figure 8:
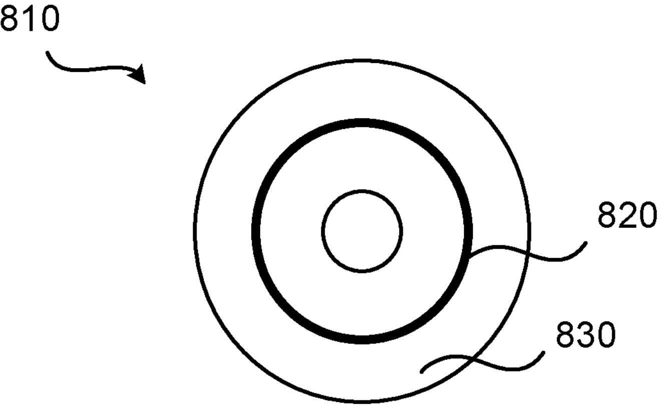
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 710 and thereto operatively coupled entities and devices, such as the interface 720 and the storage medium 730, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

It is to be understood that the present invention is not limited to the embodiments described above and illustrated in the drawings; rather, the skilled person will recognise that many changes and modifications may be made within the scope of the appended claims.

The invention claimed is:

1. A method for determining a modified slip target $\mu_{trgt}$ for a vehicle engine speed controller, the method comprising:

comparing a difference between a maximum wheel speed $\omega_{max}$ and a minimum wheel speed $\omega_{min}$ for wheels of open differential and driven axles controlled by the vehicle engine speed controller to a preconfigured wheel speed offset $\Delta S$; and setting, at least when the difference $\omega_{max}-\omega_{min}$ exceeds the preconfigured wheel speed offset $\Delta S$, the modified slip target $\mu_{trgt}$ to be lower than a requested slip target $\mu_{req}$ for the vehicle engine speed controller, wherein the modified slip target is determined as:

$$\mu_{trgt} = \mu_{req} / K$$

Where $K \geq 1$ is a reduction factor, and wherein the reduction factor K is a function of the difference $\omega_{max}-\omega_{min}$ and the preconfigured wheel speed offset $\Delta S$.

2. The method of claim 1, wherein the method further comprises:

setting, when the difference $\omega_{max}-\omega_{min}$ is larger than 0, the modified slip target $\mu_{trgt}$ to be lower than a requested slip target $\mu_{req}$ for the vehicle engine speed controller.

3. The method of claim 1, wherein the method further comprises:

setting, when the difference $\omega_{max}-\omega_{min}$ fails to exceed the preconfigured wheel speed offset $\Delta S$, the modified slip target $\mu_{trgt}$ to at most be equal to the requested slip target $\mu_{req}$.

4. The method of claim 1, wherein the reduction factor K is determined according to:

$$K = \min\left(\max\left(\frac{\omega_{max} - \omega_{min}}{\Delta S} + \theta, c_1\right), c_2\right)$$

where $\theta$ is an offset value, where $c_1$ and $c_2$ are constants, and wherein $1 \leq c_1 < c_2$.

5. The method of claim 4, wherein $c_2 \leq 2$.

6. The method of claim 1, wherein the reduction factor K is limited to, over time, change differently depending on whether the difference $\omega_{max}-\omega_{min}$ is increasing or decreasing over time.

7. The method of claim 1, wherein the reduction factor K is limited to, over time, change at most according to a rate of change, r, that is limited to:

$$r = \begin{cases} \infty & \text{when } \frac{dK}{dt} > 0 \\ K_{RtLim} & \text{otherwise} \end{cases}$$

where $$\frac{dK}{dt}$$

describes how much the reduction factor K changes over time, and where $K_{RtLim} < 0$ is a constant.

8. The method of claim 1, wherein the maximum wheel speed $\omega_{max}$ is determined as:

$$\omega_{max} = \max(\omega_1, \omega_2, \omega_3, \ldots)$$

and the minimum wheel speed $\omega_{min}$ is determined as:

$$\omega_{min} = \min(\omega_1, \omega_2, \omega_3, \ldots)$$

where $\omega_i$ is the wheel speed for wheel i of the open differential and driven axles of the vehicle.

9. The method of claim 1, wherein the method further comprises:

converting, with respect to a reference wheel speed $\omega_{ref}$, the modified slip target $\mu_{trgt}$ to an engine speed limit $v_{lim}$.

10. The method of claim 9, wherein the method further comprises:

controlling wheel speeds of the wheels of the open differential and driven axles according to the engine speed limit $v_{lim}$.

11. A system for determining a modified slip target $\mu_{trgt}$ for a vehicle engine speed controller, the system comprising processing circuitry, the processing circuitry being configured to cause the system to:

compare a difference between a maximum wheel speed $\omega_{max}$ and a minimum wheel speed $\omega_{min}$ for wheels of open differential and driven axles controlled by the vehicle engine speed controller to a preconfigured wheel speed offset $\Delta S$; and set, at least when the difference $\omega_{max}-\omega_{min}$ exceeds the preconfigured wheel speed offset $\Delta S$, the modified slip target $\mu_{trgt}$ to be lower than a requested slip target $\mu_{req}$ for the vehicle engine speed controller, wherein the modified slip target is determined as:

$$\mu_{trgt} = \mu_{req} / K$$

where $K \geq 1$ is a reduction factor, and wherein the reduction factor K is a function of the difference $\omega_{max}-\omega_{min}$ and the preconfigured wheel speed offset $\Delta S$.

12. The system of claim 11, the processing circuitry being configured to cause the system to:

set, when the difference $\omega_{max}-\omega_{min}$ is larger than 0, the modified slip target $\mu_{trgt}$ to be lower than a requested slip target $\mu_{req}$ for the vehicle engine speed controller.

13. The system of claim 11, the processing circuitry being configured to cause the system to:

set, when the difference $\omega_{max}-\omega_{min}$ fails to exceed the preconfigured wheel speed offset ΔS, the modified slip target $\mu_{trgt}$ to at most be equal to the requested slip target $\mu_{req}$.

14. The system of claim 11, the processing circuitry being configured to cause the system to:

convert, with respect to a reference wheel speed $\omega_{ref}$, the modified slip target $\mu_{trgt}$ to an engine speed limit $v_{lim}$.

15. The system of claim 11, the processing circuitry being configured to cause the system to:

control wheel speeds of the wheels of the open differential and driven axles according to the engine speed limit $v_{lim}$.

16. A vehicle comprising the system of claim 11.

17. A non-transitory computer-readable storage medium for determining a modified slip target $\mu_{trgt}$ for a vehicle engine speed controller, the non-transitory computer-readable storage medium comprising program code which, when run on processing circuitry of a system, causes the processing circuitry to:

compare a difference between a maximum wheel speed $\omega_{max}$ and a minimum wheel speed $\omega_{min}$ for wheels of open differential and driven axles controlled by the vehicle engine speed controller to a preconfigured wheel speed offset ΔS; and set, at least when the difference $\omega_{max}-\omega_{min}$ exceeds the preconfigured wheel speed offset ΔS, the modified slip target $\mu_{trgt}$ to be lower than a requested slip target $\mu_{req}$ for the vehicle engine speed controller, wherein the modified slip target is determined as:

$$\mu_{trgt} = \mu_{req} / K$$

Where K≥1 is a reduction factor, and wherein the reduction factor K is a function of the difference $\omega_{max}-\omega_{min}$ and the preconfigured wheel speed offset ΔS.

* * * * *